UNITED STATES PATENT OFFICE.

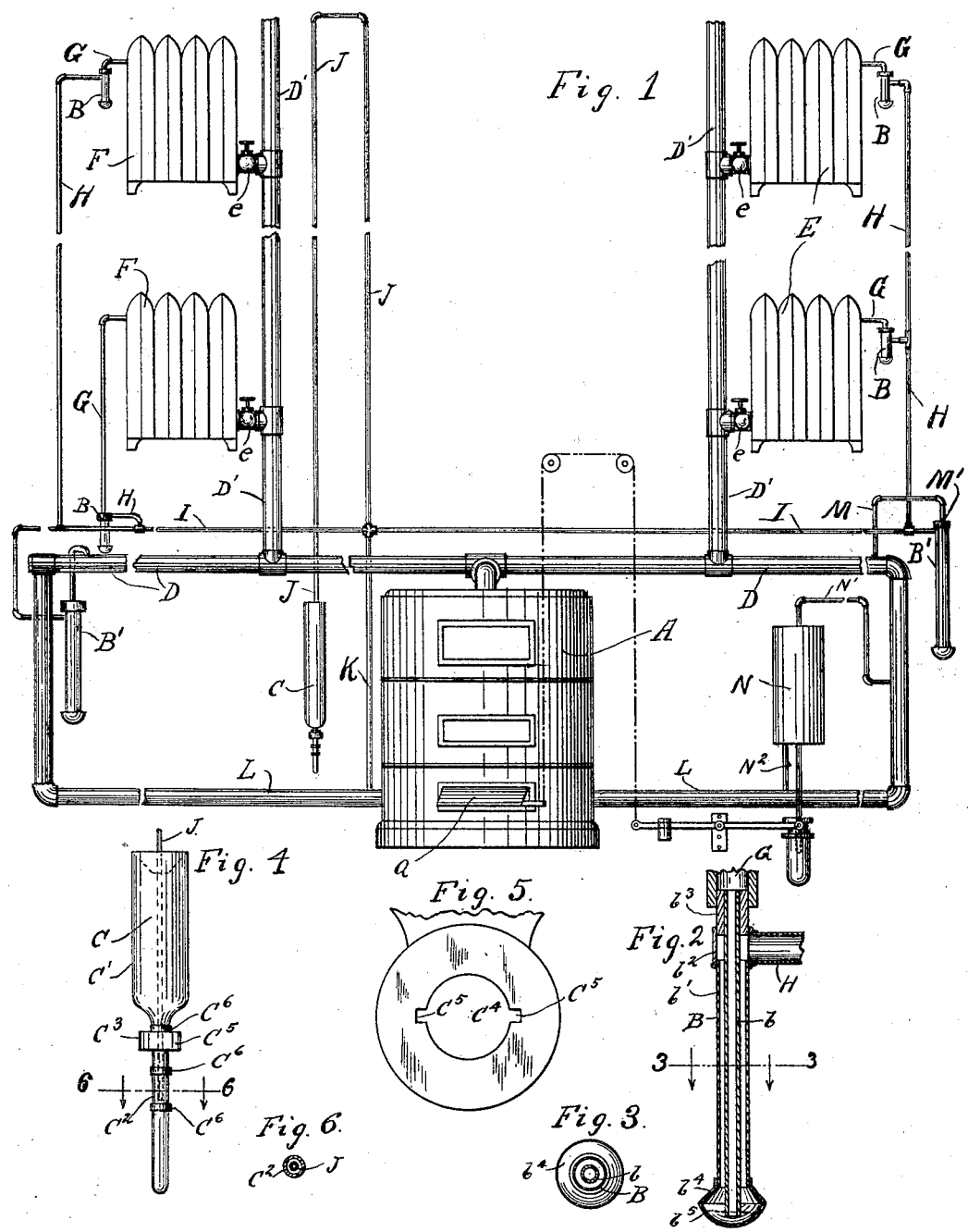

DOCTOR FRANKLIN MORGAN, OF CHICAGO, ILLINOIS.

STEAM-HEATING PLANT.

SPECIFICATION forming part of Letters Patent No. 722,127, dated March 3, 1903.

Application filed December 2, 1901. Serial No. 84,393. (No model.)

*To all whom it may concern:*

Be it known that I, DOCTOR FRANKLIN MORGAN, a citizen of the United States, and a resident of Chicago, county of Cook, and State of Illinois, have invented certain new and useful Improvements in Steam-Heating Plants, of which the following, when taken in connection with the drawings accompanying and forming a part hereof, is a full and complete description, sufficient to enable those skilled in the art to which it pertains to understand, make, and use the same.

This invention relates to what are termed "gravity" steam-heating plants, whether single or double pipe.

The objects of the invention are to obtain a steam-heating plant wherein the delivery of steam for heating purposes to all the radiators of the plant is insured without the use of an air-valve or expansible member to the several radiators, to obtain a steam-heating plant which may be operative at less than atmospheric pressure when desired, and to obtain a steam-heating plant which may be adjusted to operate at a determined pressure above atmospheric when desired.

In the apparatus embodying this invention any number of radiators may be interposed in the plant and various modes of attaching such radiators may be adopted.

In the drawings referred to, Figure 1 is an elevation of a part of a steam-heating plant embodying this invention. Fig. 2 is a vertical sectional view of one of the combined water, steam, and air traps illustrated in Fig. 1, showing the interior construction thereof. Fig. 3 is a cross-section of Fig. 2 on line 3 3 thereof viewed in the direction indicated by the arrows. Fig. 4 is a side elevation of an additional and adjustable combined water, steam, and air trap, also illustrated in Fig. 1. Fig. 5 is a top plan view of the base of the trap illustrated in Fig. 4, and Fig. 6 is a sectional view on line 6 6 of Fig. 4 viewed in the direction indicated by the arrows.

A reference-letter applied to designate a given part is used to indicate such part throughout the several figures of the drawings wherever the same appears.

A is a boiler, and $a$ is the damper to the furnace of the boiler.

B is a combined water, steam, and air trap.

C is an adjustable combined water, steam, and air trap.

D is a pipe connection between boiler A and the several radiators E E and F, whereby steam is supplied to such radiators, as through the several branch pipes D' D'.

G G G are air-pipe connections communicating with the end of the several radiators opposite to the branch pipes D' D' and extending therefrom to the respective water, steam, and air traps B B, and H H are branch pipes communicating with the respective traps B B and extending therefrom to the return-pipe I.

J is a pipe communicating at one end with the return-pipe I and with the boiler A, as through the pipes K and L, and at the other end communicating with the trap C.

M is a pipe communicating at one end with the bleeder end of steam-supply pipe D and at the other end with the combined water, steam, and air trap B' (attached thereto at M') and through such last-named trap B' communicating with the return-pipe I.

The bleeder end of the steam-supply pipe D is connected to the boiler A below the water-line therein by means of communicating pipe L. The return end of the return-pipe I is connected to the boiler A through the pipes K and L.

N is a damper-controlling apparatus. N' is the steam-supply pipe of such damper-controlling apparatus, and $N^2$ is the steam and water of condensation discharge pipe from such apparatus.

The return-pipes G G G communicate at the lower ends thereof, respectively, with a combined water, steam, and air trap B, and the combined water, steam, and air traps B B are connected to the return-pipe I by means of the several branch pipes H H H. The radiators F F, (as well as the radiators E E,) are provided with the return-pipes G G, communicating with the water, steam, and air trap B, which trap is in communication with the return-pipe I through the branch pipe H.

The combined water, steam, and air traps B B B' consist, respectively, of an outer casing, at the upper end of which the return-pipes G G G are respectively attached in such manner as to extend below the surface of mercury or other fluid contained in the outer casing and to be thereby sealed with an annular space surrounding the ingoing pipe and such annular space communicating with a discharge-pipe.

$b$ is a pipe in trap B, attached at the upper end thereof to nipple $b^3$, to which nipple pipe G is also attached. Pipe $b$ extends below the surface of mercury or other fluid $b^5$ in well $b^4$.

$b'$ is the outer casing of the trap B and is attached at its upper end to T $b^2$ and at the lower end to well $b^4$. Nipple $b^3$ is attached to T $b^2$, and branch pipe H is also attached to the T $b^2$. The annular chamber between pipe $b$ and casing $b'$ is thus in communication with discharge-pipe H, and the return-pipe G is in communication with such annular chamber when the pressure in pipe G and $b$ is sufficient to force the contents thereof through the mercury or other liquid $b^5$ in well $b^4$. The lower end of the pipe $b$ is sealed against fluid-pressure in pipe H and the annular chamber between pipe $b$ and casing $b'$ by fluid $b^5$, as such pressure tends to force such fluid into the pipe $b$.

Any water of condensation, steam, or air flowing from the respective return-pipes G into the depending pipes $b$ in the respective traps B will remain in such pipes $b$ until the pressure in the radiators and return-pipes is sufficient to force the water of condensation, steam, or air through the liquid $b^5$, whereupon the same will be discharged from such trap B to the branch pipe H thereof and from thence to the return-pipe I. The traps B therefore produce greater pressure in the several steam-supply pipes D' D' and radiators E and F than in the air-pipes H H and return-pipe I, and this result is obtained when the only liquid in such traps is water of condensation.

The adjustable combined water, steam, and air traps C comprises the casing C', provided with neck $C^2$, depending therefrom, and the base $C^3$, through which base such neck extends. Base $C^3$ is provided with the aperture $C^4$, Fig. 5, through which the neck $C^2$ loosely passes, and such aperture $C^4$ is provided with the recesses $C^5$ $C^5$, through which the lugs $C^6$ $C^6$ on neck $C^2$ may loosely pass. Lugs $C^6$ $C^6$ are rigidly secured on neck $C^2$, and hence the combined water, steam, and air trap C may be adjusted by turning it so that the lugs $C^6$ $C^6$ pass through recesses $C^5$ $C^5$, and such trap is secured in an adjusted position by thereafter turning the trap so that the lugs $C^6$ $C^6$ rest on the upper side of the base $C^3$, say, at right angles to recesses $C^5$ $C^5$. The pipe J extends into the neck $C^2$, and the lower end thereof is designed to be sealed by liquid, preferably mercury, contained in such neck $C^2$. The hole in the upper end $C^7$, through which the pipe J extends, is sufficiently large to obtain atmospheric pressure on the surface of the liquid contents of neck $C^2$. The pressure carried in the steam plant embodying this invention is varied and controlled by the raising and lowering of the casing C' on base $C^3$, as thereby the lower end of the return-pipe J is varied with reference to the depth thereof below the surface of the liquid contents of the neck $C^2$.

N' is a steam-supply pipe from the bleeder end of steam-supply pipe D to damper-controlling device N.

Each radiator is supplied with an ordinary valve $e$, whereby it may be cut out of the plant when desired.

The temperature of the rooms or other spaces warmed by the radiators of a steam-heating plant embodying this invention is controlled by the temperature of the heating fluid in the system, and I have therefore provided means whereby air may be expelled from the system—that is, by raising the temperature and pressure of the heating fluid sufficiently to force the air therein through the steam-supply pipe D, branches D' D', radiators E E and F F, combined water, steam, and air traps B B and B', branch pipes H H, return-pipe I, pipe J, and the adjustable combined water, steam, and air trap C to the atmosphere—means whereby the temperature and pressure required to force the air from the system may be varied, as by the variation of the position of casing C' relative to the lower end of pipe J, as hereinbefore described, and means to automatically control the generation of steam in the boiler of the plant, whereby when the air has been driven from the plant, as described, steam may be generated and maintained at less than atmospheric pressure, as by the automatic damper-controlling device N. As any other efficient damper-controlling device may be substituted for damper-controlling device N and as such damper-controlling device N is fully described and claimed in application filed by me August 10, 1901, Serial No. 71,565, the same is not herein illustrated in detail or described; but in my opinion the efficiency of a steam-heating plant embodying this invention would be seriously crippled if automatic means for varying the temperature and pressure of the heating fluid were not provided.

I do not claim as new the combined water, steam, and air traps B B, nor the seal C, nor do I confine myself to the use of such particular traps or seals, as any substitute means for obtaining greater pressure in the radiators of the system than obtains in the return air-pipes, while air and steam may flow from such radiators, respectively, into the air-pipes, may be used in place of trap B, and any substitute means which will permit the contents of pipe J to flow therethrough and will seal such pipe at the delivery end thereof from an inflow may be employed without departing from this invention as described and claimed. The greater pressure in the radiators over the pressure in the air-pipes is for the purpose of insuring the flow of steam to all the radiators of the system before obtaining a flow of steam into the air-pipes from the several radiators, and such difference in pressure should be sufficient to prevent the cutting out of any of such radiators in the operation of the apparatus. Whatever device is used as a substitute for the combined steam, water, and air traps B such device must be one which is not closed to the passage of steam by the action of the steam— that is, it must not be a thermostatic expansible member—as steam is required in the air-pipes in the operation of this system, and such steam should be delivered thereinto from the several radiators.

The operation of a steam-heating plant embodying this invention is as follows: A fire is started in the furnace of the boiler and steam is generated of sufficient pressure to pass through the supply-pipes, the radiators, return-pipes, and traps, and to the atmosphere. If the spaces warmed by the plant are not sufficiently heated, the adjustable water, steam, and air trap is raised in its base, so as to increase the depth at which the end of pipe J is immersed, and if such warmed spaces are too highly heated, the damper $a$ of the furnace is closed to reduce the generation of steam in the boiler thereof. When the quantity of steam generated is insufficient to resupply that lost by being reduced to water of condensation, the pressure of steam in the plant will gradually fall below atmosphere pressure, and thereafter the desired temperature of the heating fluid can be varied, as desired, from below atmospheric pressure to any pressure necessary above atmospheric.

It will be understood that the pressure necessary to drive air from the system must be greater than the pressure required to force such air through either trap B or C and sufficient to drive it through both—that is, the pressure in branch pipes H H and return-pipe I must be sufficient to force the air through trap C, the pressure in pipes H and I being obtained by the steam therein from the return-pipes G and the radiators, and the pressure in return-pipes G G must be sufficiently above the pressure in branch pipes H H and return-pipe I to drive air through the trap B, and that there will always be a determined difference in pressure between pipes G G and pipes H H I, the greater pressure being in pipes G G, respectively, and that the raising of the pressure in pipes H H I by raising the adjustable sealing device or adjustable trap C on its base $C^3$—that is, the adjusting of the trap C so that the pipe J is more deeply submerged in the liquid contents of neck $C^2$—will raise the pressure in the pipes G G a corresponding amount, (the difference in pressure being constant,) and that thereby the pressure in the radiators E E F must be raised before any air, water of condensation, and steam will be forced from the radiators and the discharge-pipes G G into branch pipes H H and discharge-pipe I and before air will be forced from such discharge-pipe I through air-pipe J and adjustable trap C to the atmosphere.

The presence of steam in branch pipes H H and return-pipe I forces the air therefrom by heat as well as by pressure, and that if the air is not forced from such pipes it will be held therein under pressure, or at least atmospheric pressure, and when the steam in the radiators is sufficiently less than atmospheric it will flow back into such radiators through the several combined water, steam, and air traps B B or their substitutes, carrying the contents of such traps therewith into the several radiators, as such traps, even when constructed as illustrated and mercury is used as a sealing liquid, are not of sufficient length to withstand the difference in pressure between atmospheric and that existing in the radiators.

When the return-pipes are freed from air, the main seal C is the only one which is subjected to atmospheric pressure on one side, with a vacuum, or nearly so, on the other side, in the operation of the system, and such seal C must be made sufficiently large so that a pressure of fifteen pounds will not effect passage of air therethrough into the system.

It will be observed that if the damper-controlling device is subjected to or controlled by climatic temperature the temperature of the spaces heated by the apparatus will be automatically controlled by the steam-heating plant embodying this invention.

By means of valve $e$ any radiator in the plant can have the steam-supply thereto cut off therefrom, and (because of return-pipe G being sealed in trap B) the working of the remaining radiators in the plant will not be affected thereby.

Any water of condensation in return-pipe I will flow therefrom by gravity through pipe K back to boiler A, and any air in the bleeder end of steam-supply pipe D will flow therefrom through the pipe M and trap B (attached at M' thereto) into return-pipe I and from thence (along with the air in such return-pipe) through trap C to the atmosphere.

Any water of condensation in the bleeder end of steam-supply pipe D will flow therefrom through pipe L back to boiler A.

I prefer to supply steam to damper-controlling device N from the bleeder end of steam-supply pipe D through the pipe N'.

Any air in the bleeder end of steam-supply pipe D will flow therefrom through pipe M and steam-trap (or sealing apparatus) B into the discharge-pipe I and from thence (together with other air in such discharge-pipe I) will flow therefrom through air-pipe J and adjustable trap C to the atmosphere. The adjustment of the trap C by varying the pressure in air-pipe J and discharge-pipe I, as hereinbefore described, varies the pressure required in the bleeder end of steam-supply pipe D to force the air from such bleeder end through pipe M and trap B into pipe I, as last above described, and as steam is supplied to the damper-controlling device N through the pipe N' and as no steam will flow from such bleeder end of steam-supply pipe D through such pipe N' until the air has been driven, as described, through the pipe M the variation of the steam-trap C produces corresponding variation in the operation of the damper-controlling device N to close the damper of the furnace of the boiler, thereby insuring the circulation of steam at a determined pressure throughout the entire plant before the damper-controlling device N will be operated to close the damper.

Having thus described my invention, what I claim as new, and desire to secure by Letters Patent, is—

1. In a steam-heating plant, the combination of radiators, steam-pipes connected to the respective radiators, air-pipes from the respective radiators, means to retard the flow of steam from the radiators into the respective air-pipes, a pipe communicating with the air-pipes forming the return-pipe therefor, such return-pipe communicating with the steam-generator of the system, a seal, an additional pipe communicating with the return-pipe and extending therefrom upward and then downward to form a loop terminating in the seal, the riser of such loop rising to a sufficient height to prevent, under normal pressure, the passage of water of condensation to the seal from the return-pipe; substantially as described.

2. In a steam-heating system, the combination of radiators, steam-pipes connected to the respective radiators, a return-pipe, air-withdrawing pipes communicating, respectively, with the return-pipe and with the radiators, means to retard the flow of steam from the radiators into the return-pipe through the respective air-withdrawing pipes, such return-pipe communicating with the steam-generator of the system, a seal, an additional pipe communicating with the return-pipe and extending upward therefrom and then downward to form a loop and such downwardly-extending part of the loop terminating in the seal, the riser of such loop of sufficient height to prevent, under normal pressure, the passage of water of condensation from the return-pipe to the seal; substantially as described.

3. In a steam-heating system, the combination of radiators, steam-pipes connected to the respective radiators, a return-pipe, pipes communicating, respectively, with the return-pipe and with the radiators to withdraw the air from the radiators and deliver it to the return-pipe, means to retard the flow of steam from the radiators through the respective air-withdrawing pipes into the return-pipe, such return-pipe communicating with the steam-generator of the system below the water-line thereof, a seal, an additional pipe communicating with the return-pipe and extending upward therefrom and then downward to form a loop and such downwardly-extending part of the loop terminating in the seal, the riser of such loop of sufficient height to prevent, under normal pressure, the passage of water of condensation from the return-pipe to the seal, an additional pipe communicating with the bleeder end of the steam-pipe and with the return-pipe, and means interposed in such additional pipe to retard the flow of steam from the steam-pipe to the return-pipe; substantially as described.

DOCTOR FRANKLIN MORGAN.

In presence of—
CHARLES TURNER BROWN,
CORA A. ADAMS.